(12) United States Patent
Sparre et al.

(10) Patent No.: US 7,528,814 B2
(45) Date of Patent: May 5, 2009

(54) METHOD AND DEVICE PROVIDING ENHANCED CHARACTERS

(75) Inventors: Erik Sparre, Lomma (SE); Erland Unruh, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 834 days.

(21) Appl. No.: 10/837,072

(22) Filed: Apr. 30, 2004

(65) Prior Publication Data

US 2005/0001856 A1    Jan. 6, 2005

Related U.S. Application Data

(63) Continuation of application No. PCT/EP02/11028, filed on Oct. 2, 2002.
(60) Provisional application No. 60/330,949, filed on Nov. 5, 2001.

(30) Foreign Application Priority Data

Nov. 2, 2001  (EP)  ................. 01610112

(51) Int. Cl.
  *G09G 3/36*    (2006.01)
(52) U.S. Cl. .............. 345/89; 345/600; 345/611; 345/612; 345/614; 345/690; 382/298; 382/299; 382/300
(58) Field of Classification Search .............. 345/132, 345/136, 611, 690–695, 596, 597, 600, 612–614, 345/89
See application file for complete search history.

(56) References Cited

U.S. PATENT DOCUMENTS

| | | | |
|---|---|---|---|
| 6,243,070 B1 | 6/2001 | Hill et al. | |
| 6,542,161 B1* | 4/2003 | Koyama et al. | 345/589 |
| 7,002,596 B1* | 2/2006 | Soohoo | 345/611 |
| 7,148,893 B2* | 12/2006 | Stamm et al. | 345/469 |

FOREIGN PATENT DOCUMENTS

| | | |
|---|---|---|
| EP | 0435391 A2 | 7/1991 |
| WO | WO 00/52673 A1 | 9/2000 |

OTHER PUBLICATIONS

Gibson Research Corp., "How Sub-Pixel Font Rendering Works",[online], retrieved on Dec. 20, 2004] Retrieved from the Internet: <URL: http://grc.com/ctwhat.htm>.

* cited by examiner

*Primary Examiner*—My-Chau T Tran
*Assistant Examiner*—Jennifer T Nguyen
(74) *Attorney, Agent, or Firm*—Potomac Patent Group PLLC (57) ABSTRACT

A method of providing enhanced characters suitable for display on substantially low-resolution displays includes scaling-down a first representation of at least one character belonging to a given font according to a predetermined factor. A second representation of the at least one character results. The first representation is a monochrome pixel representation and the second representation is a sub-pixel representation. The second representation is converted to a color display representation according to a set of predetermined criteria.

18 Claims, 5 Drawing Sheets

Figure 3

METHOD AND DEVICE PROVIDING ENHANCED CHARACTERS

RELATED APPLICATIONS

This application is a continuation of International Application No. PCT/EP02/11028, filed on Oct. 2, 2002, which claims the benefit of U.S. Provisional Application No. 60/330,949, filed Nov. 5, 2001, the entire contents of which are each incorporated here by reference.

BACKGROUND

The present invention relates to a method of providing enhanced characters better suited for being displayed on substantially low-resolution displays/screens.

The present invention also relates to a device providing enhanced characters better suited for being displayed on substantially low-resolution displays/screens.

Additionally, the invention relates to a method of displaying enhanced characters in a portable device comprising a memory and a display, using relatively little real-time memory and relatively little real-time processing power, and a portable device for displaying enhanced characters in a portable device, comprising a memory and a display, using relatively little real-time memory and relatively little real-time processing power.

When displaying characters on certain types of displays/screens, the typeface designer is typically severely limited by the low number of display pixels available, thereby making the displayed characters appear very simple or jagged. This is especially true for low-resolution displays such as those used in mobile terminals/phones, PDAs, etc.

One technique of improving a perceived smoothness of displayed characters on a display/screen is the well-known technique of anti-aliasing, using shades of grey where font designers would like to show only 'part' of a pixel. The perceived smoothness of displayed characters is obtained by the fact that a viewer's eyes will tend to average two adjacent grey pixels to see one in the 'middle', i.e. the two adjacent pixels are perceived as a single pixel located and with a color intensity/grey-level in the middle of the two adjacent pixels. However, anti-aliasing has the side effects, especially for small types/characters, that the characters become blurred and the readability is greatly reduced.

Another technique of improving the display of characters is the well-known technique of using sub-pixel rendering. Sub-pixels are a number of smaller pixels making up a single ordinary pixel, where each sub-pixel is associated with one of the three primary colors (red, green or blue). The human eye is not capable of registering closely spaced colors individually, since the vision system deliberately mixes these three primary colors in combination to form intermediates dependent on the intensity of each of the three primary colors.

Sub-pixel rendering only works with full effect on color displays where the red, green, blue components are made up of 'sub-pixels', i.e. colored strips, like an LCD display, etc. The ordering of the sub-pixels is typically red-green-blue although some are blue-green-red. However, fonts using sub-pixels shown on other types of displays like CRTs, grey-scale LCD displays, etc. will also be better perceived due to the inherent well-known anti-aliasing effect of sub-pixels.

An LCD screen with a given horizontal pixel resolution (e.g. 800 pixels) actually has a horizontal sub-pixel resolution three times greater (e.g. 2400 single color sub-pixels) when using sub-pixels. Sub-pixels may then be used to smooth jagged contours, lines, etc. by using the knowledge of the given ordering of the primary color and the corresponding sub-pixels and by 'borrowing' sub-pixels from adjacent whole pixels, thereby enabling fine-tuning of placement, width, etc. of a contour, character, etc. with a three times greater horizontal accuracy. However, the pixels along a contour would be non-white (due to the use of sub-pixels), but the human eyes would still perceive them as absolutely white, since the color of the sub-pixel is immediately adjacent to the other primary colors (e.g. red is adjacent to green and blue).

See e.g. http://grc.com/ctwhat.htm as pr. 2/11-2001 for further details regarding anti-aliasing and sub-pixel rendering.

However, both of the above techniques typically rely on the fact that the typeface is described by curve definitions, outlined fonts, etc. which requires a relative large amount of memory for storage. Additionally, the processing power required to render them (i.e. calculate what pixels to color) in real-time is quite substantial, which also requires a relatively great power consumption of a device performing the technique(s).

SUMMARY

An object of the invention is to provide a method that provides enhanced characters better suited for display on relatively low resolution displays.

Another object is to provide a method with a simple rendering procedure of characters/fonts, thereby enabling real-time rendering.

An additional object is to provide a method of providing characters using relatively little memory for storage.

Yet another object is to provide a method of providing characters using a relatively small amount of processing power (and small amount of power consumption in a device/system/apparatus implementing the method).

These objects, among others, are achieved by a method of the aforementioned kind, said method comprising the steps of:

scaling-down a first representation of at least one character belonging to a given font according to a predetermined factor resulting in a second representation of the at least one character, where the first representation is a monochrome pixel representation and the second representation is a sub-pixel representation, converting the second representation to a color display representation according to a set of predetermined criteria.

Hereby, a method is provided that provides a display representation of a character/font enabling better appearance on a display on the basis of a simple monochrome pixel representation, i.e. a first representation.

Additionally, only a relatively small amount of memory is required for storage while achieving better appearance on a substantially low-resolution display, since no extra memory is required for the storing of the sub-pixel font/character(s), i.e. the second representation, but only memory for the storing of the monochrome pixel representation although using the sub-pixel representation to obtain better appearance.

Additionally, a relatively simple character/font rendering procedure is obtained, thereby enabling real-time rendering of characters/fonts since only scale-down of a monochrome pixel representation and simple conversion of the scaled down representation are involved. The simple procedure also enables a relatively low power consumption since less computational effort is needed.

The method is especially advantageous when displaying relatively small fonts/characters (e.g. smaller than 15 pixels in height) on relatively low-resolution displays.

Preferably, the predetermined factor of scaling-down is three, i.e. the resolution of the first representation is three times greater than the resolution of the second representation. In this way, a very simple scale-down step may be obtained since only whole pixels/sub-pixels need to be considered, due to the fact that typically three sub-pixels exist for each pixel in a sub-pixel representation. Actually, only the horizontal resolution needs to be three times greater in order to arrive at whole pixels/sub-pixels, but both resolutions must be three times greater for preserving the aspect ratio of the first representation, while only using whole pixels/sub-pixels.

Alternatively, the scale-down step involves criteria for handling fractions of pixels for other predetermined factors.

In one embodiment,
the first representation comprises a number of monochrome pixels defining the at least one character,
the second representation comprises a number of parts each comprising a number of sub-pixels, and/or
the display representation comprises a number of pixels where each pixel corresponds to a part of the second representation.

In a preferred embodiment, the first representation is substantially comprised of 3×3 pixel blocks where either none, 1×3, 2×3 or 3×3 pixels is 'on', 'black', etc. The opposite of 'on' is 'off', 'white', etc.

Hereby, the step of scaling-down is greatly simplified, since 1×3 pixels being 'on' is scaled to 1 sub-pixel being 'on' in the corresponding part of the second representation, 2×3 (or twice 1×3) pixels is scaled to two sub-pixels, 3×3 pixels is scaled to three sub-pixels and no pixels is scaled to no sub-pixels being 'on'.

In an embodiment, the step of converting comprises
processing of the second representation resulting in an intermediate sub-pixel representation given by: for a number of sub-pixels in the second representation, if a given sub-pixel is 'on', then the intensity of the given sub-pixel is allocated a third of its current intensity and the immediately adjacent neighbors of the given sub-pixel in the horizontal direction is each also allocated a third of the current intensity of the given sub-pixel in the intermediate sub-pixel representation, and
converting at least a part of the intermediate sub-pixel representation, the part comprising three associated sub-pixels each representing a different color, to a resulting pixel in the display representation, where the color of the resulting pixel is a weight of the intensities for each associated sub-pixel and the color that each sub-pixel represents.

Note that a given sub-pixel's current intensity may already be changed due to the processing of a neighbor sub-pixel, as will be described later in greater detail.

Since the neighbors of a sub-pixel to the left and to the right are always its two complementary colors, this energy sharing/division has the effect of instantly rebalancing any local discoloration.

In a preferred embodiment, the step of converting comprises performing the step of processing twice using the output of the step performed first as input for the step performed next, resulting in an intermediate sub-pixel representation being used in the step of converting.

This avoids/reduces blurring due to the energy filtering, by first dividing the energy/intensity of every sub-pixel, like explained above, resulting in sub-pixels with a different intensity, and secondly dividing the energy of the sub-pixels by the different intensity. This reduces the energy of the immediate neighbor sub-pixels by distributing some of the intensity/energy to the next closest pair of neighbors.

In this way, a perfect local color balance is maintained while keeping the most of the energy in the centre of the spread. The different energy/intensity of the pixels in the display representation will result in a color font that will appear monochrome on a grey-level/scale display while appearing to be high resolution in the eye of a viewer.

In one embodiment, the set of predetermined criteria comprises:
if zero or 1 sub-pixel from a given part of the second representation is 'on', then the corresponding pixel of the display representation is set to 'off', and
if two or three sub-pixels from a given part of the second representation are 'on', then the corresponding pixel of the display representation is set to 'on', or
if zero or 1 sub-pixel from a given part of the second representation is 'on' then the corresponding pixel of the display representation is set to 'off',
if two or three adjacent sub-pixels from a given part of the second representation are 'on', then the corresponding pixel of the display representation is set to be 'on', and
if two non-adjacent sub-pixels from a given part of the second representation are 'on', then the corresponding pixel of the display representation is set to 'off'

Hereby, a very simple conversion of a sub-pixel representation to a display representation, suitable for being shown on a relatively low-resolution display, is obtained, enabling real-time rendering.

In another embodiment, the step of converting comprises grey-scale anti-aliasing, thereby reducing the perceived jaggedness of a displayed character and/or font further.

In a preferred embodiment, the anti-aliasing is done as follows:
if one sub-pixel from a given part of the second representation is 'on', then the corresponding pixel of the display representation is set to 'off',
if two adjacent sub-pixels from a given part of the second representation are 'on', then the corresponding pixel of the display representation is set to a predetermined level/shade of 'grey',
if three sub-pixels from a given part of the second representation are 'on', then the corresponding pixel of the display representation is set to 'on'.

In a preferred embodiment, the anti-aliasing is as follows:
if one sub-pixel from a given pixel/part of the second representation is 'on', then the corresponding pixel of the display representation is set to a predetermined level/shade of 'light grey',
if two sub-pixels from a given pixel/part of the second representation are 'on', then the corresponding pixel of the display representation is set to a predetermined level/shade of 'dark grey', and
if three sub-pixels from a given pixel/part of the second representation are 'on', then the corresponding pixel of the display representation is set to 'on'.

In this way, simple and efficient anti-aliasing is obtained at the same time as the second representation is converted to the display representation.

In one embodiment, the method further comprises the step of displaying the display representation on an LCD display.

In a preferred embodiment, the method is used in a mobile communication device such as a mobile telephone, PDA, smart-phone, etc.

In an alternative embodiment, the method further comprises the steps of:

retrieving a display representation of at least one character belonging to a given font from a memory of a portable device further comprising a display, the display representation comprising a number of pixels defining the at least one character where each pixel comprises color information, displaying the character representation on the display, where the character representation is a pre-generated color display representation stored in the memory of the device and being generated and/or processed by another device/system according to the above mentioned embodiments of the method.

In this way, advanced and/or complex rendering/transformation procedures may be applied once and for all in a single device/system, and the resulting character representation may then be distributed to many display devices so that these devices do not have to apply the rendering procedures at the actual time of rendering. Since the advanced and/or complex rendering procedures take place outside the display device that actually displays the character(s)/font(s), it may consume any amount of resources including time, memory and/or processing power.

Additionally, a typical rendering engine designed for handling monochrome/grey-level fonts/characters in a device that displays the transformed character(s)/font(s) does not have to be changed to accommodate the transformation and advanced/complex rendering procedures, e.g. including color information, thereby enabling simple rendering engines in the display devices.

This also holds for simpler rendering/transformation procedures with the same advantages but to a smaller extent.

Additionally, a method is provided that avoids the need for implementing sub-pixel procedures as part of the rendering engine/stage when displaying information on a screen/display, thereby making the rendering stage/engine simpler and avoiding the use of resources in the form of memory and processing power.

Further the result of complex rendering and/or sub-pixel procedures in a simple rendering engine/stage to be run on a relative simple processor with a relatively small amount of available memory is obtained.

The invention also relates to a device for providing enhanced characters better suited for being displayed on substantially low-resolution displays comprising:

means for scaling-down a first representation of at least one character belonging to a given font according to a predetermined factor, resulting in a second representation of the at least one character, where the first representation is a monochrome pixel representation and the second representation is a sub-pixel representation, means for converting the second representation to a color display representation according to a set of predetermined criteria.

In one embodiment of the device, the first representation comprises a number of monochrome pixels defining the at least one character, the second representation comprises a number of parts each comprising a number of associated sub-pixels, and/or the display representation comprises a number of pixels where each pixel corresponds to a part of the second representation.

In one embodiment of the device, the first representation is substantially comprised of 3×3 pixel blocks where either none, 1×3, 2×3 or 3×3 pixels is 'on'.

In one embodiment of the device, the means for converting is adapted to process the second representation resulting in an intermediate sub-pixel representation given by: for a number of sub-pixels in the second representation, if a given sub-pixel is 'on', then the intensity of the given sub-pixel is allocated a third of its current intensity and the immediately adjacent neighbors of the given sub-pixel in the horizontal direction is each also allocated a third of the current intensity of the given sub-pixel in the intermediate sub-pixel representation, and convert at least a part of the intermediate sub-pixel representation, the part comprising three associated sub-pixels each representing a different color, to a resulting pixel in the display representation, where the color of the resulting pixel is a weight of the intensities for each associated sub-pixel and the color that each sub-pixel represents.

In one embodiment of the device, the set of predetermined criteria comprises performing the step of processing twice using the output of the step performed first as input for the step performed next, resulting in an intermediate sub-pixel representation being used in the step of converting.

In one embodiment of the device, the set of predetermined criteria comprises:

if zero or 1 sub-pixel from a given part of the second representation is 'on', then the corresponding pixel of the display representation is set to 'off', and if two or three sub-pixels from a given part of the second representation are 'on', then the corresponding pixel of the display representation is set to 'on', or if zero or 1 sub-pixel from a given part of the second representation is 'on', then the corresponding pixel of the display representation is set to 'off', if two or three adjacent sub-pixels from a given part of the second representation are 'on', then the corresponding pixel of the display representation is set to be 'on', and if two non-adjacent sub-pixels from a given part of the second representation are 'on', then the corresponding pixel of the display representation is set to 'off'.

In one embodiment of the device, the means for converting comprises means for applying grey-scale anti-aliasing.

In one embodiment of the device, the means for applying anti-aliasing is arranged such that:

if one sub-pixel from a given part of the second representation is 'on', then the corresponding pixel of the display representation is set to 'off', if two adjacent sub-pixels from a given part of the second representation are 'on', then the corresponding pixel of the display representation is set to a predetermined level/shade of 'grey', if three sub-pixels from a given part of the second representation are 'on', then the corresponding pixel of the display representation is set to 'on', or according to:

if one sub-pixel from a given pixel/part of the second representation is 'on', then the corresponding pixel of the display representation is set to a predetermined level/shade of 'light grey', if two sub-pixels from a given pixel/part of the second representation are 'on', then the corresponding pixel of the display representation is set to a predetermined level/shade of 'dark grey', and if three sub-pixels from a given pixel/part of the second representation are 'on', then the corresponding pixel of the display representation is set to 'on'.

In one embodiment of the device, the device further comprises an LCD display for displaying the display representation.

In one embodiment of the device, the device is a mobile communication device such as a mobile telephone, PDA, smart-phone, etc.

In one embodiment of the device, the device further comprises means adapted to:
retrieve a display representation of at least one character belonging to a given font from a memory of a portable device further comprising a display, the display representation comprising a number of pixels defining the at least one character where each pixel comprises color information,
display the character representation on the display, where the character representation is a pre-generated color display representation stored in the memory of the device and being generated and/or processed by another device/system according to the previous mentioned embodiments of the method according to the present invention.

The device and embodiments thereof have the same advantages for the same reasons as the method and embodiments thereof, and therefore they will not be described again.

An additional aspect of the invention is to provide a method that avoids the need for implementing sub-pixel procedures as part of the rendering engine/stage when displaying information on a screen/display, thereby making the rendering stage/engine simpler and avoiding the use of resources in the form of memory and processing power.

Another additional aspect is to enable the result of complex rendering and/or sub-pixel procedures in a simple rendering engine/stage to be run on a relative simple processor with a relatively small amount of available memory.

This is achieved by a method of displaying enhanced characters in a portable device comprising a memory and a display, using relatively little real-time memory and relatively little real-time processing power, said method comprising the steps of:
retrieving a character bitmap representation of at least one character belonging to a given font from the memory, the character representation comprising a number of pixels defining the at least one character, where each pixel comprises color information,
displaying the character representation on the display, where the character representation is a pre-generated color representation stored in the memory of the device and being generated and/or processed by another device/system.

In this way, advanced and/or complex rendering/transformation procedures may be applied once and for all in a single device/system, and the resulting character representation may then be distributed to many display devices so that these devices do not have to apply the rendering procedures at the actual time of rendering. Since the advanced and/or complex rendering procedures take place outside the display device that actually displays the character(s)/font(s), it may consume any amount of resources including time, memory and/or processing power.

Additionally, a typical rendering engine designed for handling monochrome/grey-level fonts/characters in a device that displays the transformed character(s)/font(s) does not have to be changed to accommodate the transformation and advanced/complex rendering procedures, e.g. including color information, thereby enabling simple rendering engines in the display devices.

In one embodiment, the character representation is a sub-pixel color representation.

In another embodiment, the character representation comprises anti-aliasing information.

The invention also relates to a portable device for displaying enhanced characters, comprising a memory and a display, using relatively little real-time memory and relatively little real-time processing power, where the device comprises means for:
retrieving a character bitmap representation of at least one character belonging to a given font from the memory, the character representation comprising a number of pixels defining the at least one character, where each pixel comprises color information, and
displaying the character representation on the display, where the character representation is a pre-generated color representation stored in the memory of the device and being generated and/or processed by another device/system.

In one embodiment of the device, the character representation is a sub-pixel color representation.

In one embodiment of the device, the character representation comprises anti-aliasing information.

BRIEF DESCRIPTION OF THE DRAWINGS

The present invention will now be described more fully with reference to the drawings, in which.

DETAILED DESCRIPTION

Figure 1:
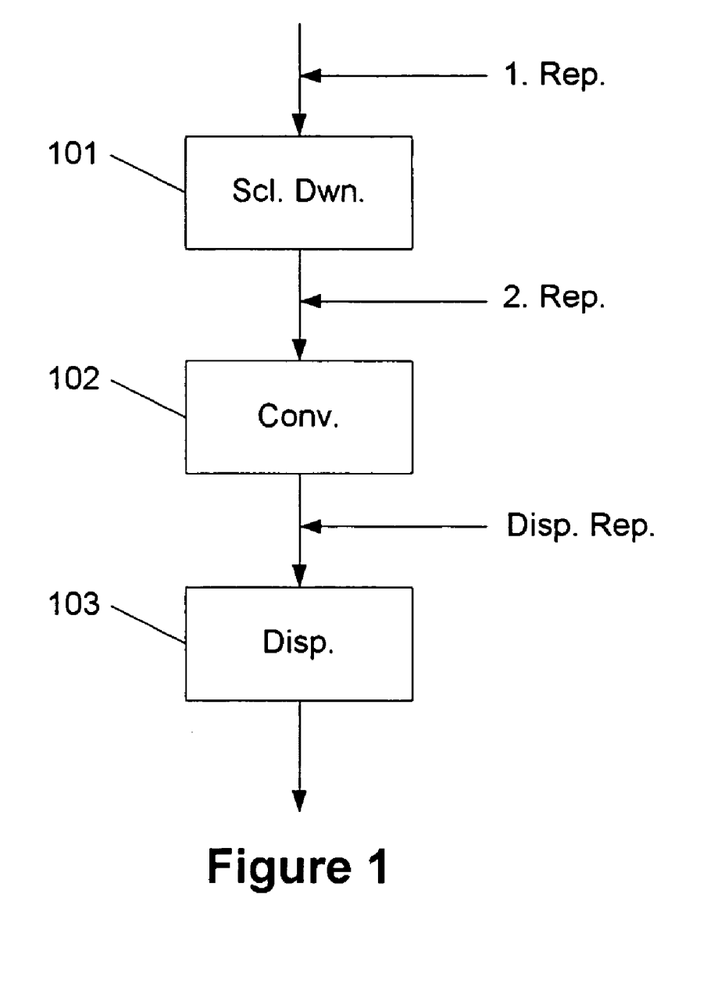
FIG. 1 illustrates a flow-chart of an embodiment of the invention.

FIG. 1 illustrates a flow-chart of an embodiment of the invention. A first representation of at least one character/font is scaled-down at step (101) according to a predetermined factor, resulting in a second representation of the at least one character/font. The character/font in the second representation is then converted at step (102) into a display representation according to a set of predetermined criteria. The character/font in the display representation is then shown on a display at step (103).

In one embodiment, grey-scale anti-aliasing is used (not shown) as well in the conversion from the second representation to the display representation.

The method and embodiments thereof will be explained in greater detail in connection with FIGS. 2*a*-2*c*, using the character 'S' as an example.

Figure 2A:
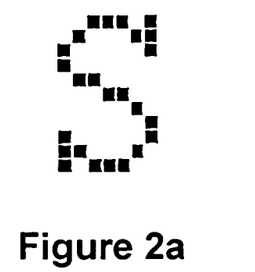
FIG. 2*a* shows a regular monochrome pixel/bitmapped character.

FIG. 2*a* shows a regular monochrome pixel/bitmapped character. Shown is an example of a regular bitmapped character with a size of 7×11 pixels defining/representing the letter 'S'. This character would appear very jagged and simple when being displayed on a display with a relatively low resolution e.g. like the ones typically found in PDAs, mobile communication devices such as a mobile telephone, smartphone, etc.

Figure 2B:
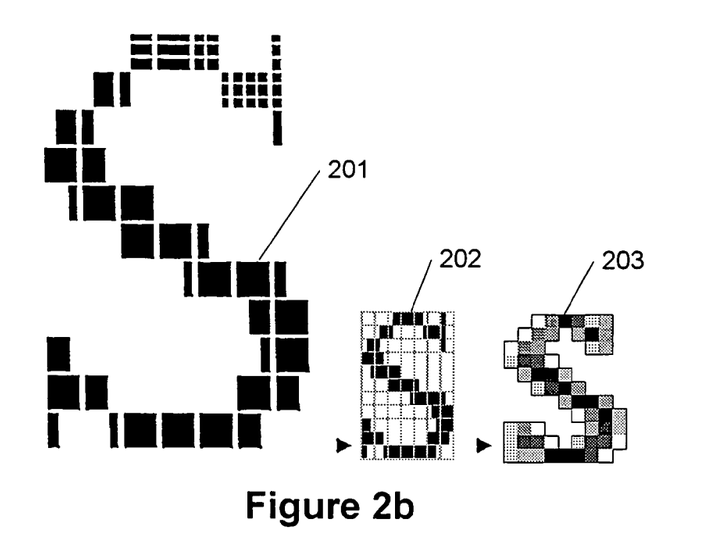
FIG. 2*b* illustrates the scaling and conversion according to the present invention.

FIG. 2b illustrates the steps of scaling and conversion according to the present invention. Shown are the scaling and conversion steps performed on the letter 'S'. Shown is a 21×33 pixel monochrome bitmapped representation/a first representation of the letter 'S' (201). Every pixel being 'on', 'black', etc. is only shown for certain parts of the 'S' (201) (at the top right), while only blocks of 9 pixels (3×3) or parts/segments thereof (1×3; 2×3) being 'on', 'black', etc. are shown elsewhere for the sake of simplicity.

Preferably, the first representation only comprises blocks of (1×3), (2×3) and (3×3) pixels being 'on', 'black', etc., as this simplifies the scaling-down step considerably.

Alternatively, other blocks of pixels may be used to define the given character.

The 'S' (201) is scaled down to a sub-pixel version of the 'S' (202) according to a predetermined factor. In this particular example, by a factor of 3 thereby giving the sub-pixel version (202) a size of 7×11 pixels, where each pixel consists of three sub-pixels.

In this particular example/embodiment, the scaling-down may be done quite simply by considering each block of 9 (3×3) pixels, and for each block determining whether a (1×3), (2×3) and (3×3) segment/part (or none) is 'on' in the given block and where. A (1×3) segment has three possible locations, a (2×3) segment two and a (3×3) segment only one location in a block of (3×3) pixels. After determining the given segment being 'on' (if any) and the location in a given block, a corresponding sub-pixel is generated in the second representation (202). That is an 'on' (1×3) segment becomes a single 'on' sub-pixel at the same location in the corresponding pixel as the (1×3) segment has in the corresponding block, an 'on' (2×3) segment becomes two 'on' sub-pixels at the same location in the pixel as the segment has in the block and a 'on' (3×3) segment becomes an 'on' pixel (all three sub-pixels are 'on'). An 'off', white, etc. (3×3) segment becomes an 'off' pixel (all three sub-pixels are 'off'). A 3×3 block, in the first representation (201), may e.g. comprise two 1×3 'on' segments located at each end (left/beginning and right/end) of the respective 3×3 block, whereby two sub-pixels become 'on' in the corresponding pixel in the second representation (202).

In this particular example/embodiment, the scaling is very simple since only whole segments/sub-pixels need to be considered, due to the fact that three sub-pixels (one for each primary color) exist for each pixel in a sub-pixel representation. Actually, only the horizontal resolution of the first representation needs to be three times greater than the horizontal resolution of the second representation in order to arrive at whole segments/sub-pixels, but both resolutions need to be three times greater for preserving the aspect ratio of the first representation in the second representation, while only using whole pixels/sub-pixels in a very simple fashion.

Alternatively, the scale-down step involves criteria/sub-procedures for handling fractions of segments, pixels, etc. for other predetermined factors than three. These criteria/sub-procedures may e.g. comprise scaling a 1×3 segment with two 'on' pixels down to a single 'on' sub-pixel at the same location, and scaling a 1×3 segment with one pixel down to a single 'off' sub-pixel in the second representation.

The sub-pixel version/the second representation of 'S' (202) is then converted into a display version (203) according to a set of criteria. In one embodiment the criteria may be:

if zero or 1 sub-pixel from a given part/pixel of the second representation is 'on', then the corresponding pixel of the display representation is set to 'off', and if two or three sub-pixels from a given part/pixel of the second representation are 'on', then the corresponding pixel of the display representation is set to 'on'.

In another embodiment, the criteria may be:

if zero or 1 sub-pixel from a given part/pixel of the second representation is 'on', then the corresponding pixel of the display representation is set to 'off', if two or three adjacent sub-pixels from a given part/pixel of the second representation are 'on', then the corresponding pixel of the display representation is set to be 'on', and if two non-adjacent sub-pixels from a given part/pixel of the second representation are 'on', then the corresponding pixel of the display representation is set to 'off'

The only difference between the two sets of criteria is that in the last one two non-adjacent sub-pixels would be set to 'off' in the display representation, while it would be set to 'on' according to the first set of criteria.

Figure 2C:
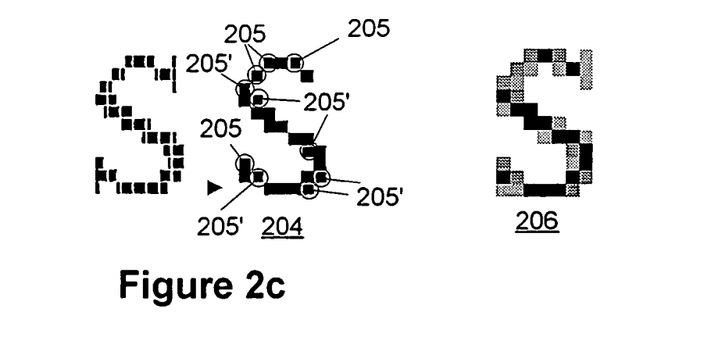
FIG. 2*c* illustrates anti-aliasing according to the present invention.

These criteria would give the display representation shown as (206) in FIG. 2c with all the shown dark-grey or black pixels defining 'S' being 'on'/'black' and all the light-grey pixels as being 'off', i.e. no color and/or grey-scale pixels.

In a preferred embodiment the conversion of the second representation (202) to the display representation (203) is done by filtering, etc. the energy/light intensity for each sub-pixel in the second representation (202), resulting in an intermediate sub-pixel representation (not shown) having the same size as the second representation, before the actual conversion. This may be done by spreading/distributing the energy of each sub-pixel between itself and its two neighbors as follows: If a given sub-pixel is 'on'/black in the second representation (202), the corresponding sub-pixel in the intermediate sub-pixel representation is turned 'on' to a third of the original intensity. Additionally, the two immediately adjacent neighbors of the given sub-pixel are also turned 'on' to a third of the intensity, i.e. the 'visual energy' for a given sub-pixel is divided equally between itself and its two neighbors (each ending with a third of the total energy/intensity for the given sub-pixel). That is, if a given sub-pixel and its two horizontal neighbors are all fully 'on', then the given sub-pixel will be fully 'on' (because a third of its energy is distributed to its neighbors and a third of their energy is received by the given sub-pixel from each neighbor) and if a sub-pixel and one or two of its neighbors are 'off', then the resulting intensity of it will be two thirds, one third, or fully 'off', respectively.

Since the neighbors of a sub-pixel to the left and the right are always its two complementary colors, this energy sharing/division has the effect of instantly rebalancing any local discoloration.

Preferably, the sub-pixels are filtered once more in order to avoid blurring due to the energy filtering, i.e. first dividing the energy of every sub-pixel, as explained above, resulting in sub-pixels with a different intensity, and secondly dividing the energy of the sub-pixels with the different intensity. This reduces the energy of the immediate neighbor sub-pixels by distributing some of the intensity/energy to the next closest pair of neighbors, i.e. after the two filtering steps a single sub-pixel having an intensity of 1 will have a third of the intensity, the immediate neighbor sub-pixels 2/9, and the next closest neighbor sub-pixels have 1/9 (assuming that the closest and next-closest sub-pixels have the intensity of 0 at the beginning, otherwise this energy will also be distributed accordingly). See e.g. FIG. 2D for a schematic representation of the double filtering process. This is normally referred to as five-element low-pass window filtering.

In this way, an appropriate local color balance is maintained, while keeping most of the energy in the centre of the spread.

After performing the filtering or the double filtering, each pixel (comprising three sub-pixels) of the resulting intermediate sub-pixel representation is converted to a single pixel in the display representation (203) having a color dependent on the individual intensity of the three sub-pixels, i.e. the resulting color will have a weighted intensity of the intensity of each sub-pixel. As an example, a pixel in the intermediate sub-pixel representation has a relative sub-pixel intensity of (2/9; 3/9; 2/9) for the sub-pixels (R; G; B), then the resulting color pixel in the display representation (203) would have the following color defined by: 2/9*Red_Max_int; 3/9*Green_Max_int; 2/9*Blue_Max_int, where Color_Max_int is the maximum intensity for that specific Color. If the maximum intensities are 1, then the resulting pixel will have the color defined by 2/9 Red, 3/9 Green, and 2/9 Blue (for RGB ordered sub-pixels).

The different energy/intensity of the pixels in the display representation (203) will result in a color font that will appear monochrome on a grey-level/scale display while appearing to be high resolution in the eye of a viewer. The different colors of the pixels shown in the display representation (203) in FIG. 2b are represented by a raster pattern, but each pixel has a single well-defined color with a well-defined intensity. Additionally, some of the color intensities are very light why the 'S' has been outlined in order to indicate where color intensities appear.

Hereby, a very simple conversion of a sub-pixel representation to a display representation, suitable for being shown on a relatively low-resolution display, is obtained. The display representation will especially appear less jagged on a striped color LCD due to the use of sub-pixels in the conversion, but will also look better on a grey-scale LCD, a CRT, etc.

The scaling-down and conversion procedures are very simple and may be executed in real-time on relatively simple processors as e.g. found in PDAs, mobile communication device such as a mobile telephone, smart-phone, etc.

FIG. 2c illustrates anti-aliasing according to the present invention. It is possible to perform grey-scale anti-aliasing at the same time as the conversion of the second representation to the display representation in order to make a character/font appear more smooth in color and/or grey-scale displays in a very efficient and simple manner. Shown is a sub-pixel/second representation of the character 'S' which corresponds to the representation (202) in FIG. 2b. Also shown is a grey-scale anti-aliased display representation (204) and an alternative preferred grey-scale anti-aliased display representation (206).

In one embodiment, the anti-aliasing is done as follows:
 if one sub-pixel from a given pixel/part of the second representation is 'on', then the corresponding pixel of the display representation is set to 'off',
 if two adjacent sub-pixels from a given pixel/part of the second representation are 'on', then the corresponding pixel of the display representation is set to a predetermined level/shade of 'grey', and
 if three sub-pixels from a given pixel/part of the second representation are 'on', then the corresponding pixel of the display representation is set to 'on'.

In this way, the pixels designated (205) and (205') would be grey-scale instead of 'on', thereby giving a less jagged and more smooth appearance when presented on a display.

Alternatively, the anti-aliasing may include criteria where neighbor pixels (in the second representation) to a given pixel (including diagonal neighbors) are examined in order to determine whether the corresponding pixel should be grey-scale or black. If only two or fewer of the neighbor pixels (in the second representation) are 'on', then the otherwise grey-scale pixel (in the display representation) will be 'on'/'black' instead of grey-scale.

Hereby only the pixels designated (205') would be grey-scale, while the pixels designated (205) would be 'on'.

In an alternative preferred embodiment, the anti-aliasing is done as follows:
 if one sub-pixel from a given pixel/part of the second representation is 'on', then the corresponding pixel of the display representation is set to a predetermined level/shade of 'light grey',
 if two sub-pixels from a given pixel/part of the second representation are 'on', then the corresponding pixel of the display representation is set to a predetermined level/shade of 'dark grey', and
 if three sub-pixels from a given pixel/part of the second representation are 'on', then the corresponding pixel of the display representation is set to 'on'.

This produces the grey-scale anti-aliased display representation (206), which would appear even smoother and less jagged to a viewer when shown on a display than the representation (204).

Alternatively, other criteria may be used.

Figure 2D:
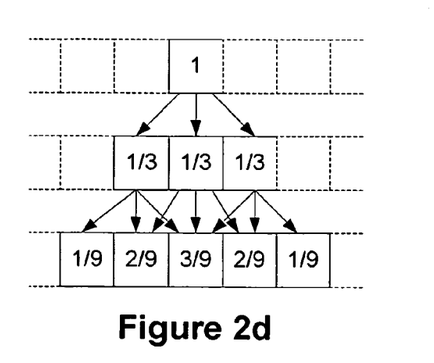
FIG. 2*d* shows a schematic representation of a distribution/double filtering process of the intensity/energy of a sub-pixel according to a preferred embodiment.

FIG. 2d shows a schematic representation of a distribution/double filtering process of the intensity/energy of a sub-pixel according to a preferred embodiment. Shown is how the original/current (e.g. relative) intensity of '1' of a single sub-pixel is affected by filtering/processing once (second row) and twice (third row) before the result is converted into the display representation. In this example, the neighbor sub-pixels have a starting intensity of '0' for simplicity's sake. As can be seen, the original intensity for a given sub-pixel is divided between the sub-pixel itself and its immediate neighbor sub-pixels. This is done each time the filtering/processing step is executed (which is preferably twice), and in the second step of filtering/processing (third row) the resulting intensities from the first filtering/processing is divided for each sub-pixel between itself and its two neighbors.

For several sub-pixels being 'on', etc. the intensity of each is divided correspondingly, e.g. sub-pixels having the intensity (0; 0; 1; 1; 0; 0) would yield (0; 1/3; 2/3; 2/3; 1/3; 0) (after first filtering/processing) and (1/9; 3/9; 5/9; 5/9; 3/9; 1/9) (after second filtering/processing).

Slightly different rules have to be formulated for sub-pixels at the border of the second representation, e.g. the intensity is divided between itself and its only neighbor or, preferably, a third is given to itself and its neighbor.

Figure 2E:
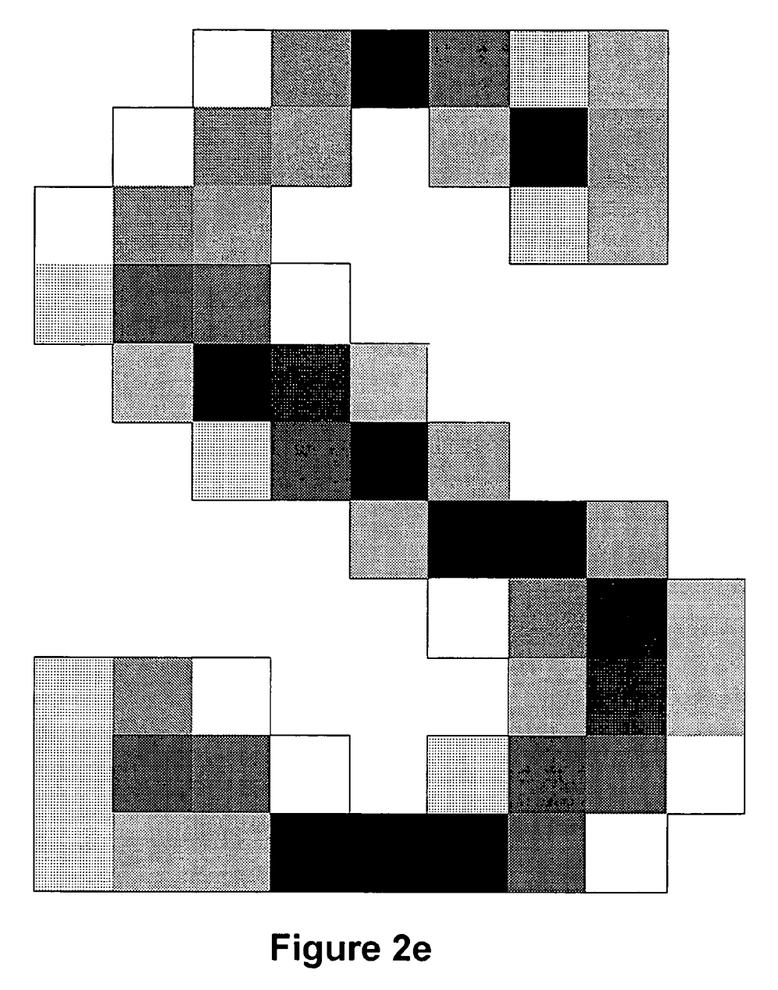
FIG. 2*e* shows an enlarged version of the display representation shown in FIG. 2*b;*

FIG. 2e shows an enlarged version of the display representation shown in FIG. 2b. Some of the color intensities are very light why the 'S' has been outlined in order to indicate where color intensities (other than zero intensity) appear.

Figure 3:
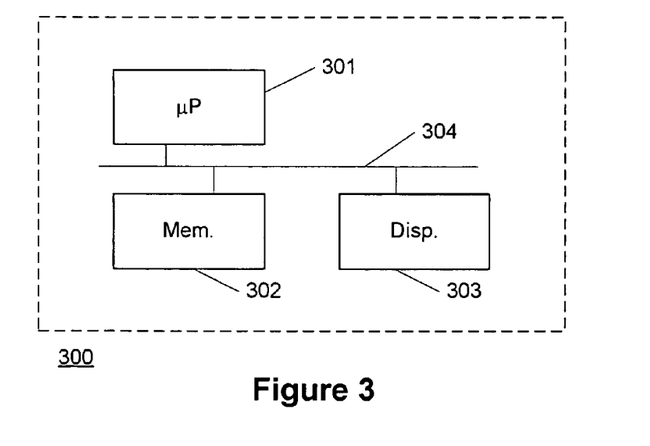
FIG. 3 illustrates a schematic block diagram of an embodiment of a device according to the present invention.

FIG. 3 illustrates a schematic block diagram of an embodiment of a device according to the present invention. Shown is a device (300) according to the present invention comprising one or more micro-processors (301) connected with a memory/storage (302) and a display (303) via a communications bus (304) or the like. The memory (302) has the simple monochrome first representation stored as well as firmware, relevant software, rendering engine and/or program instructions, etc. The micro-processor(s) (301) is(are) responsible for fetching a character/font in the first representation from the memory/storage (302) and executing the scale-down, conversion, anti-aliasing procedures described elsewhere in order to derive the display representation, which is sent to be displayed at the display (303) for presentation e.g. under the control of a another/specialized processor directly responsible for generating the display presentation on an LCD screen or the like.

Additionally, the second aspect on the invention, as will be explained in greater detail in connection with FIG. 5, may also be used in connection with the device (300), thereby obtaining the advantages mentioned elsewhere.

Figure 4:
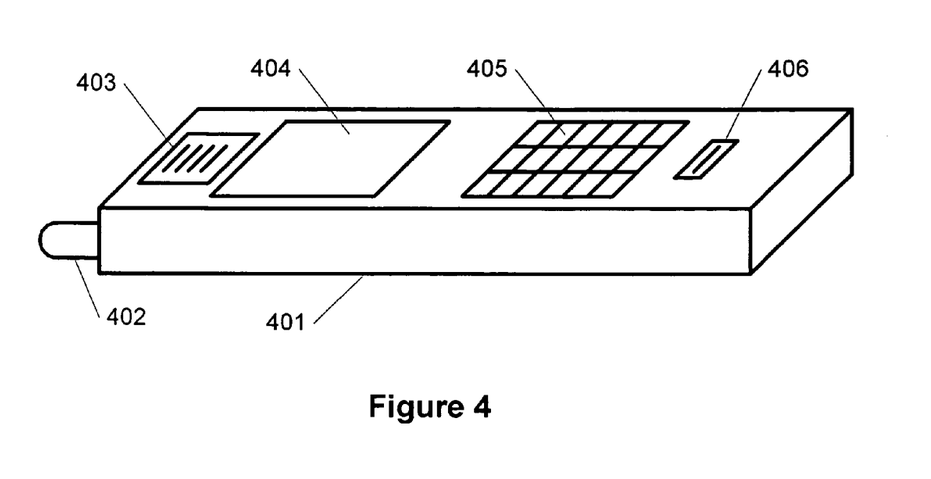
FIG. 4 shows a preferred embodiment of the invention, which may contain the device and/or use the method according to the present invention.

FIG. 4 shows a preferred embodiment of the invention, which may comprise the device(s) and/or use the method(s) according to the present invention. Shown is a mobile communication device (401) having display means (404), input means (405) like a keypad, touch screen, etc., an antenna (402), a microphone (406), and a speaker (403). By configuring the device(s) and/or using the method(s) according to the present invention, a low-memory enhanced font/character rendering is obtained in real-time.

Additionally, enhanced font/character rendering possible in real-time even on relatively simple processor types like the ones found in PDAs, mobile communication devices such as a mobile telephone, smart-phone, etc. is obtained.

Additionally, the second aspect of the invention, as explained in greater detail in connection with FIG. 5, may also be used in connection with the mobile communication device (401), thereby obtaining the advantages mentioned elsewhere.

Figure 5:
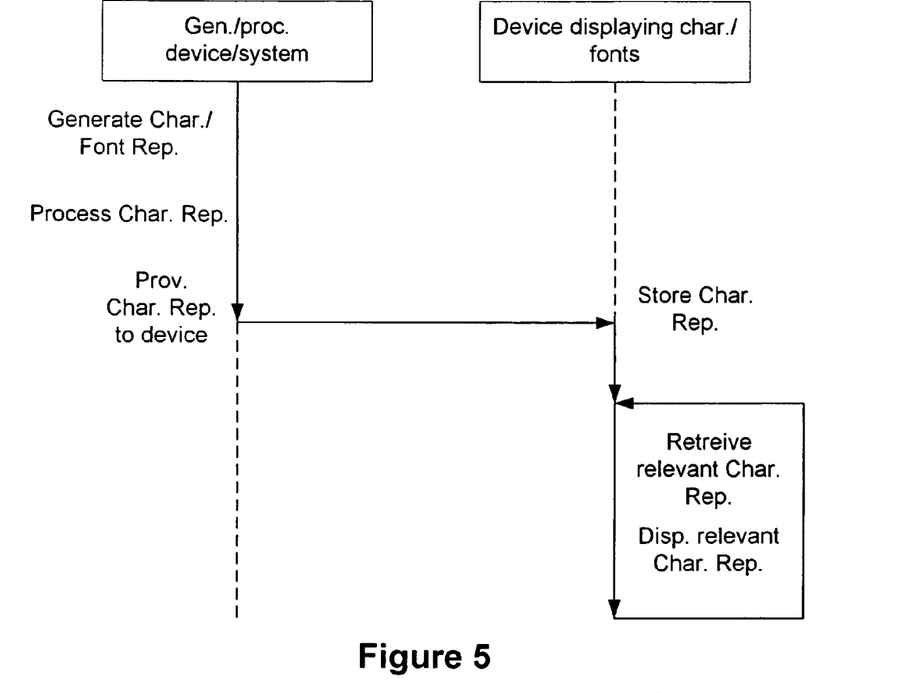
FIG. 5 shows another aspect of the present invention.

FIG. 5 shows another aspect of the present invention. Shown are a generating/processing system (501) and a device (502) for displaying enhanced fonts/characters. A character and/or font representation is generated or input at the system (501), where it is used as a basis for complex processing, rendering, transformation procedures that may use a relatively large amount of resources like computation power, time, memory required, etc., resulting in a suitable color display representation. Once the relevant procedures are executed and the resulting display representation is generated, it is transmitted, loaded into, stored, etc. in a device (502) for later use. When the device (502) needs to use the display representation, it is simply retrieved and displayed on the display of the device.

In this way, advanced and/or complex rendering/transformation procedures may be applied once and for all in a single device/system (501), and the resulting character representation may then be distributed to many display devices (502), so that these devices do not have to apply the rendering procedures at the actual time of rendering. Since the advanced and/or complex rendering procedures take place outside the display device that actually displays the character(s)/font(s), they may consume any amount of resources including time, memory and/or processing power.

Additionally, the need for implementing sub-pixel procedures as part of the rendering engine/stage in the device (502) when displaying information on a screen/display is avoided, thereby making the rendering stage/engine simpler and avoiding the use of resources in the form of memory and processing power.

Further, the result of complex rendering and/or sub-pixel procedures in a simple rendering engine/stage run on a relatively simple processor with a relatively small amount of available memory is enabled. One example of rendering and/or sub-pixel procedures, that may be applied once resulting in a bitmap being stored in a device for later direct retrieval each time it is to be used, is the simple method and embodiments thereof explained in connection with FIGS. 1-4 although any procedure, e.g. with great complexity, may be implemented in this way.

What is claimed is:

1. A method of providing enhanced characters better suited for being displayed on substantially low-resolution displays, the method comprising the steps of:

scaling-down a first representation of at least one character belonging to a given font according to a predetermined factor, resulting in a second representation of the at least one character, wherein the first representation is a monochrome pixel representation and the second representation is a sub-pixel representation; and converting the second representation to a color display representation according to a set of predetermined criteria, wherein the step of converting comprises:

processing of the second representation resulting in an intermediate sub-pixel representation given by: for a number of sub-pixels in the second representation, if a given sub-pixel is "on", then the intensity of the given sub-pixel is allocated a third of its current intensity and the immediately adjacent neighbors of the given sub-pixel in the horizontal direction is each also allocated a third of the current intensity of the given sub-pixel in the intermediate sub-pixel representation; and converting at least a part of the intermediate sub-pixel representation, the part comprising three associated sub-pixels each representing a different color, to a resulting pixel in the display representation, wherein the color of the resulting pixel is a weight of the intensities for each associated sub-pixel and the color that each sub-pixel represents.

2. The method according to claim 1, wherein at least one of:

the first representation comprises a number of monochrome pixels defining the at least one character;

the second representation comprises a number of parts each comprising a number of associated sub-pixels; and the display representation comprises a number of pixels wherein each pixel corresponds to a part of the second representation.

3. The method according to claim 1, wherein the first representation is substantially comprised of 3×3 pixel blocks wherein either none, 1×3, 2×3 or 3×3 pixels is "on".

4. The method according to claim 1, wherein the step of converting comprises:

performing the step of processing twice using the output of the step performed first as input for the step performed next resulting in an intermediate sub-pixel representation which is used in the step of converting.

5. The method according to claim 1, wherein the step of converting comprises greyscale anti-aliasing.

6. The method according to claim 1, comprising: displaying the display representation on an LCD display.

7. The method according to claim 1, wherein the method is used in a mobile communication device.

8. A method of providing enhanced characters better suited for being displayed on substantially low-resolution displays, the method comprising the steps of:

scaling-down a first representation of at least one character belonging to a given font according to a predetermined factor, resulting in a second representation of the at least one character, wherein the first representation is a monochrome pixel representation and the second representation is a sub-pixel representation; and converting the second representation to a color display representation according to a set of predetermined criteria, wherein the set of predetermined criteria comprises one of:

if zero or 1 sub-pixel from a given part of the second representation is "on", then the corresponding pixel of the display representation is set to "off", and if two or three sub-pixels from a given part of the second representation are "on", then the corresponding pixel of the display representation is set to "on"; and if zero or 1 sub-pixel from a given part of the second representation is "on", then the corresponding pixel of the display representation is set to "off", if two or three adjacent sub-pixels from a given part of the second representation are "on", then the corresponding pixel of the display representation is set to be "on", and if two non-adjacent sub-pixels from a given part of the second representation are "on", then the corresponding pixel of the display representation is set to "off".

9. A method of providing enhanced characters better suited for being displayed on substantially low-resolution displays, the method comprising the steps of:

scaling-down a first representation of at least one character belonging to a given font according to a predetermined factor, resulting in a second representation of the at least one character, wherein the first representation is a monochrome pixel representation and the second representation is a sub-pixel representation; and converting the second representation to a color display representation according to a set of predetermined criteria, wherein the step of converting comprises greyscale anti-aliasing, and the anti-aliasing comprises one of:

if one sub-pixel from a given part of the second representation is "on", then the corresponding pixel of the display representation is set to "off", if two adjacent sub-pixels from a given part of the second representation are "on", then the corresponding pixel of the display representation is set to a predetermined level/shade of "grey", and if three sub-pixels from a given part of the second representation are "on", then the corresponding pixel of the display representation is set to "on"; and if one sub-pixel from a given pixel/part of the second representation is "on", then the corresponding pixel of the display representation is set to a predetermined level/shade of "light gray", if two sub-pixels from a given pixel/part of the second representation are "on", then the corresponding pixel of the display representation is set to a predetermined level/shade of "darkgrey", and if three sub-pixels from a given pixel/part of the second representation are "on", then the corresponding pixel of the display representation is set to "on".

10. A device for providing enhanced characters better suited for being displayed on substantially low-resolution displays, the device comprising:

means for scaling-down a first representation of at least one character belonging to a given font according to a predetermined factor, resulting in a second representation of the at least one character, wherein the first representation is a monochrome pixel representation and the second representation is a sub-pixel representation; and means for converting the second representation to a color display representation according to a set of predetermined criteria, wherein the means for converting is configured to:

process the second representation resulting in an intermediate sub-pixel representation given by: for a number of sub-pixels in the second representation, if a given sub-pixel is "on", then the intensity of the given sub-pixel is allocated a third of its current intensity and the immediately adjacent neighbors of the given sub-pixel in the horizontal direction is each also allocated a third of the current intensity of the given sub-pixel in the intermediate sub-pixel representation; and convert at least a part of the intermediate sub-pixel representation, the part comprising three associated sub-pixels each representing a different color, to a resulting pixel in the display representation, wherein the color of the resulting pixel is a weight of the intensities for each associated sub-pixel and the color that each sub-pixel represents.

11. The device according to claim 10, wherein at least one of:

the first representation comprises a number of monochrome pixels defining the at least one character;

the second representation comprises a number of parts each comprising a number of associated sub-pixels; and the display representation comprises a number of pixels wherein each pixel corresponds to a part of the second representation.

12. A device according to claim 10, wherein the first representation is substantially comprised of 3×3 pixel blocks wherein either none, 1×3, 2×3 or 3×3 pixels is "on"/"black".

13. The device according to claim 10, wherein the means for converting is configured to process the second representation twice using the output of the first processing as input for the next processing resulting in an intermediate sub-pixel representation which is used in the step of converting.

14. The device according to claim 10, wherein the means for converting comprises means for applying grey-scale anti-aliasing.

15. The device according to claim 10, comprising an LCD display for displaying the display representation.

16. The device according to claim 10, wherein the device is a mobile communication device.

17. A device for providing enhanced characters better suited for being displayed on substantially low-resolution displays, the device comprising:

means for scaling-down a first representation of at least one character belonging to a given font according to a predetermined factor, resulting in a second representation of the at least one character, wherein the first representation is a monochrome pixel representation and the second representation is a sub-pixel representation; and means for converting the second representation to a color display representation according to a set of predetermined criteria, wherein the set of predetermined criteria comprises one of:

if zero or 1 sub-pixel from a given part of the second representation is "on", then the corresponding pixel of the display representation is set to "off", and if two or three sub-pixels from a given part of the second representation are "on", then the corresponding pixel of the display representation is set to "on"; and or if zero or 1 sub-pixel from a given part of the second representation is "on", then the corresponding pixel of the display representation is set to "off", if two or three adjacent sub-pixels from a given part of the second representation are "on", then the corresponding pixel of the display representation is set to be "on", and if two non-adjacent sub-pixels from a given part of the second representation are "on", then the corresponding pixel of the display representation is set to "off".

18. A device for providing enhanced characters better suited for being displayed on substantially low-resolution displays, the device comprising:

means for scaling-down a first representation of at least one character belonging to a given font according to a predetermined factor, resulting in a second representation of the at least one character, wherein the first representation is a monochrome pixel representation and the second representation is a sub-pixel representation; and means for converting the second representation to a color display representation according to a set of predetermined criteria, wherein the means for converting comprises means for applying grey-scale anti-aliasing, and the means for applying anti-aliasing is configured to perform one of:

if one sub-pixel from a given part of the second representation is "on", then the corresponding pixel of the display representation is set to "off", if two adjacent sub-pixels from a given part of the second representation are "on", then the corresponding pixel of the display representation is set to a predetermined level/shade of "grey", and if three sub-pixels from a given part of the second representation are "on", then the corresponding pixel of the display representation is set to "on"; and if one sub-pixel from a given pixel/part of the second representation is "on", then the corresponding pixel of the display representation is set to a predetermined level/shade of "light grey", if two sub-pixels from a given pixel/part of the second representation are "on", then the corresponding pixel of the display representation is set to a predetermined level/shade of "dark grey", and if three sub-pixels from a given pixel/part of the second representation are "on", then the corresponding pixel of the display representation is set to "on".

* * * * *